United States Patent [19]

Videm

[11] 4,421,612

[45] Dec. 20, 1983

[54] PROCESS FOR THE PREPARATION OF A DARK-COLORED, WAVE-LENGTH SELECTIVE OXIDE FILM ON ALUMINUM

[75] Inventor: Ketil Videm, Kjeller, Norway

[73] Assignee: Institutt for Energiteknikk, Kjeller, Norway

[21] Appl. No.: 279,973

[22] PCT Filed: Nov. 7, 1980

[86] PCT No.: PCT/NO80/00036

§ 371 Date: Jun. 29, 1981

§ 102(e) Date: Jun. 29, 1981

[87] PCT Pub. No.: WO81/01424

PCT Pub. Date: May 28, 1981

[30] Foreign Application Priority Data

Nov. 9, 1979 [NO] Norway ................................ 793621

[51] Int. Cl.$^3$ ......................... C23F 7/06; C25D 11/04

[52] U.S. Cl. ...................................... 204/58; 126/901; 148/6.27; 427/160

[58] Field of Search ..................... 427/160, 162, 419.2; 148/6.27; 126/901; 204/58, 38 A

[56] References Cited

U.S. PATENT DOCUMENTS

| | | | |
|---|---|---|---|
| 3,905,838 | 9/1975 | Ito | 148/6.27 |
| 3,971,674 | 7/1976 | Brandt et al. | 148/6.27 |
| 4,061,830 | 12/1977 | Greenberg | 428/469 |
| 4,145,234 | 3/1979 | Meissner | 148/6.27 |
| 4,145,462 | 3/1979 | Kuwabara et al. | 427/160 |

FOREIGN PATENT DOCUMENTS

| | | | |
|---|---|---|---|
| 2739576 | 5/1978 | Fed. Rep. of Germany | 148/6.27 |
| 823457 | 11/1959 | United Kingdom . | |

OTHER PUBLICATIONS

J. R. Rairden et al., A Chemically Formed Oxide Coating on Aluminum, *Electrochemical Technology,* vol. 4, No. 1-2 (1966), pp. 63-69.

*Primary Examiner*—Howard S. Williams
*Assistant Examiner*—William Leader
*Attorney, Agent, or Firm*—Watson, Cole, Grindle & Watson

[57] ABSTRACT

A dark-colored, wave-length selective oxide film on aluminum is prepared thereby that the metal subsequent to a cleaning treatment is submerged into a bath consisting of an aqueous solution having pH 8.9–10.9 and at a temperature of from 20° to 100° C. under conditions which result in an electrode potential of between −1.1 and −0.6 volt relative to a saturated calomel electrode. The said potential can advantageously be maintained by either addition of $H_2O_2$ to the bath or by electric polarization. In a more specific embodiment of the process there is used an aqueous solution of 1–100 g $NH_4Cl$ or $(NH_4)_2SO_4$ per liter solution with or without addition of aluminate ions $AlO_2$— or $Ca^{++}$, the pH of the solution, if necessary, being adjusted to pH 9 by addition of $NH_3$, NaOH, KOH, $Ca(OH)_2$ and that the content of silicon, chromium and phosphorus each is maintained under 10 ppm.

17 Claims, 3 Drawing Figures

Potential-pH-area for blackening of Al in basic ammonium chloride solutions shown in a Pourbaix-diagram.

Area with strong blackening

Area with some blackening

Diagram validity up to ca. 50°C.

Reflectivity as a function of the wavelength of light (for oxidized Al-surface of Example.1.)

Potential-pH-area for blackening of Al in basic ammonium chloride solutions shown in a Pourbaix-diagram.

Area with strong blackening

Area with some blackening

Diagram validity up to ca. 50°C.

USEFULLNESS OF VARIOUS COMPONENTS

| 1A | 2A | 3B | 4B | 5B | 6B | 7B | 8B | 1B | 2B | 3A | 4A | 5A | 6A | 7A | 8 |
|---|---|---|---|---|---|---|---|---|---|---|---|---|---|---|---|
| H $OH^-$ | | | | | | | | | | | | | | | He |
| Li | Be | | | | | | | | | B $B_4O_7^{--}$ | C $CO_3^{--}$ | N $NH_4^+$ | O $OH^-$ $H_2O_2$ | F $F^+$ | Ne |
| Na $Na^+$ | Mg | | | | | | | | | A1 $A1O_2^-$ | Si $SiO_3^{--}$ | P $PO_4^{---}$ | S $SO_4^{--}$ | C1 $C1^-$ | Ar |
| K $K^+$ | Ca $Ca^{++}$ | Sc | Ti | V | Cr $CrO_4^{--}$ $Cr_2O_7^{--}$ | Mn | Fe Co Ni | Cu $Cu\text{-ammon}^{++}$ | Zn | Ga | Ge | As | Se | Br | Kr |
| Rb | Sr | Y | | | | | | | | | Sn | Sb | Te | J | X |

-Code of signs

Particularly advantageous

Insoluble in the actual pH area

Can be used

Prevents blackening

Fig.3.

PROCESS FOR THE PREPARATION OF A DARK-COLORED, WAVE-LENGTH SELECTIVE OXIDE FILM ON ALUMINUM

BACKGROUND OF THE INVENTION

The present invention pertains to a process for the preparation of a dark-coloured, wave-length selective oxide film on aluminium.

Providing a dark-coloured, wave-length selective oxide film on aluminium results in products which are suitable for use, inter alia, as thermal solar panels or, due to their characteristic appearance, for decorative purposes.

In the ensuing discussion the term "spectral selectivity" will first of all be described in connection therewith that aluminium, obtained by the process according to the present invention, will be essentially perceived to the eye as having a black colour. Thereafter processes for the black-colouring of aluminium will be described, in order to show that the invention is founded on other principles than those previously known. Finally, the results from optical measurements which have been carried out, as well as some illustrative Examples, will be presented.

As is known, an absolutely black surface will absorb most radiation, but it will, according to Kirchhoff's equation, also have the highest loss of heat through radiation.

Collectors for solar heat should have a high absorption coefficient for the frequencies which the main portion of the energy of the sun rays have, at the same time as the radiation of heat should be as low as possible. The heat radiation has a much lower frequency than the main portion of the solar radiation. Thus, it is desirable that the absorption coefficient vary with the frequency of the radiation, so that the absorption coefficient will be high for high frequency and low for low frequency, i.e., a spectral selectivity which is suitable for thermal solar panels.

In addition to the classic division into black, grey, white, reflecting and bright surfaces, there exist also surfaces having a spectrally selective film. The appearance of a surface having a spectrally selective film will vary with the wave-length for the change from low to high reflection, and for solar panels it is desired that the change is to occur at a higher wave-length than is perceived by the eye. A surface of a spectrally selective film for solar panels will usually be conceived by the eye as nearly black.

The reduced radiation of long-wave infrared radiation is important for a solar panel, as it thereby is possible to obtain a higher temperature than for an absolutely black surface. Whereas an absolutely black surface will attain equilibrium between incoming and emitted radiation at about 80° C. at about 60° latitude, it is not unrealistic to expect temperatures of over 200° C. for equilibrium for radiation equilibrium for aluminium treated with the process according to the present invention. The increased temperature is of decisive importance for the possibilities of economical storage of solar heat.

The "classic" example of a surface having a spectrally selective absorbing film is so-called "black chromium" (chromium black) reported some years ago by G. E. McDonald (Sol. Energy 17, 119 (1975)). The correct explanation of the phenomenon was found by Fan et Spura (Appl. Phys. Lett. 30, 511 (1977)) who stated that these layers consisted of polycrystalline $Cr_2O_3$ admixed with extremely fine-grained chromium metal.

As aluminium treated by the process according to the present invention is given a nearly black appearance, the main features of known processes for black-colouring of aluminium will be described. A series of mutually related processes is based on the precipitation of black salts on the surface and another series of processes is to apply a porous oxide film on aluminium by anodization and fill dyestuff into the pores. To illustrate the first group of processes, it is to begin with referred to an example where also the thermal characteristics are noted.

According to Dutch Patent No. 21 066 76 copper-containing aluminium alloys can be black-coloured by means of a two-stage chemical process wherein the first bath consists of water to which $NiCl_2$, $NH_4Cl$ and KCNS have been added, and the next bath consists of water to which $HNO_3$ has been added. This process aims at giving a material having a high emission of thermal long-wave radiation, which is important for cooling surfaces, but undesired for solar heat collectors, for which it as previously mentioned is desired to have low emission for radiation having long wave-lengths.

Industrial anodizing of aluminium, for instance in sulphuric acid, chromic acid, oxalic acid or mixtures thereof, gives oxide films having thicknesses which usually are from 5 to 30 micrometers thick. Only an inner layer of up to 700 Angstrom is porefree, whereas the essential portions of the layer has tunnel-shaped pores being open to the surface. These films can be inked up and blackened by filling the pores with organic or inorganic dyestuff after or under the very anodizing. For instance, French Patent No. 22 149.10 describes a colouring process based on an anodic treatment in a bath consisting of water to which $CuSO_4$, $NiSO_4$, $(NH_4)_2SO_4$ and $H_3BO_3$ have been added.

Thus, a black compound is used and the result is therefore black also in a physical sense and not in the sense of spectral selectivity.

A further type of anodizing is the preparation of so-called barrier layers. These are impervious and transparent and up to 7000 Angstrom thick.

There exist further hard anodizing processes which give dark and sometimes nearly black oxide films. The more usual process uses a sulphuric acid bath at a temperature of about 0° C., about 70 volts and 5–20 A/dm$^2$. The dark colour is in the various hard-anodizing processes only achieved with relatively thick films, usually only at about 50 micrometers. It has for comparison been effected a series with hard-anodizing and these showed that super-pure aluminium was never coloured dark. Dark colour requires either contaminated or alloyed aluminium grades. It was shown that certain phases of contamination and alloying elements were transferred to the film in unoxidized form. As far as it is known, no satisfactory explanation has been published regarding the dark colouring which can occur in hard-anodizing. It is possible that the dark colour which is achieved in such hard-anodizing for the formation of black films on aluminium basis also shows some degree of wave-length selective characteristics, but the development work in this field was not continued because of the fact that according to the theories and equations of Maxwell and Garnett, the films must be too thick to have optimum characteristics as solar collectors. Anyway, hard-anodizing is a rather expensive process.

SUMMARY OF THE PRESENT INVENTION

With the more simple and cheap process according to the present invention, spectrally selective surfaces on aluminium is formed when it is submerged for a relatively short period of time into an aqueous solution at a controlled electrode potential. The surface will then be nearly black with a shimmer of violet, blue or green, and by varying the conditions, also brown or yellow appearance can be obtained.

More specifically, the present invention involves immersing a piece of cleaned aluminum in a bath consisting of an aqueous solution having a pH of 8.9 to 10.9 and a temperature of 20° C. to 100° C. under conditions which result in an electrode potential of between −1.1 and −0.6 volts relative to a saturated calomel electrode.

DESCRIPTION OF THE DRAWINGS

The invention is in the following to be explained by means of the following description and with reference to the attached drawings, wherein:

FIG. 3 shows the importance of a series of different ions which are necessary or desirable for blackening, ions which are without importance for the blackening, as well as ions which positively prevent blackening, respectively. FIG. 3 does also indicate insolubility in the actual pH-range for a series of ions.

DETAILED DESCRIPTION OF THE INVENTION

Figure 1:
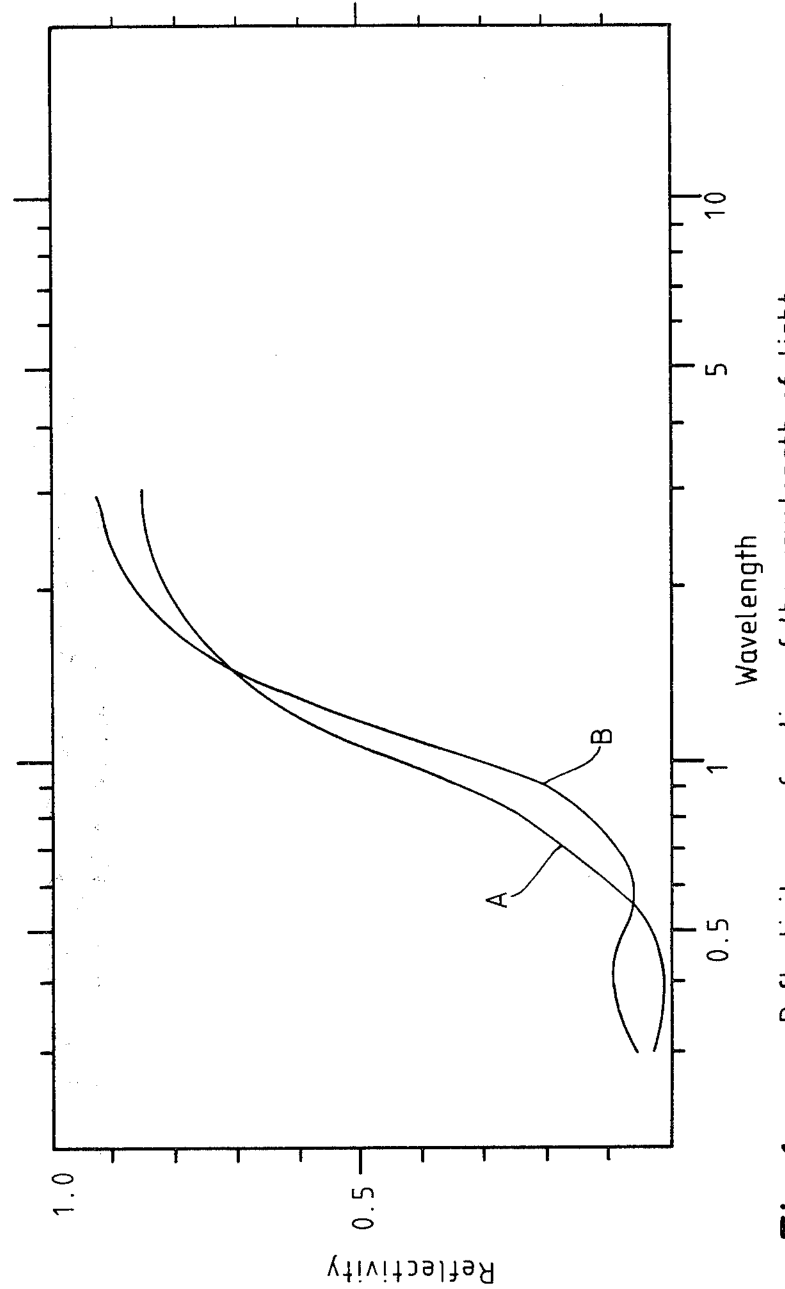
FIG. 1 shows reflectivity as a function of the wavelength of light for aluminium surfaces which have been oxidized by the process of the present invention.

FIG. 1 shows optical reflectivity as a function of the wave-length for a couple of typical films prepared by means of the process according to the present invention. The meaning of the terms A and B is given in Example 1. An "absolutely black" body will in such diagram have a reflectivity of zero for all wave-lengths and an "absolutely bright" body will have a reflectivity of 1.0. It is seen that the reflectivity of aluminium treated by the process according to the present invention has the quite specific characteristic that it shows a change from low reflectivity to high reflectivity over a wave-length range of about 1 micrometer. In spite of the fact that samples have been examined under electron microscope up to 100.000x magnification, the structure and composition of the film is not known. However, it is supposed that its optical characteristics are due to a film of aluminium oxide particles in an isolating matrix of aluminium oxide, as no other possible explanation has been found. It is known that transparent films with electrically conductive particles are wave-length selective, and this can also be derived from the equations of Maxwell Garnett for the wave character of light (J. C. Maxwell Garnett, Phil. Trans, R.Soc., London, 205, 237 (1906)).

The absorbing film achieved by the process according to the invention is in this way based on other chemical and physical principles than the methods for black-colouring of aluminium described above.

The absorbing characteristics achieved by the process according to the present invention are supposed to be caused by the electromagnetic interference phenomenon occurring in a film of particles in an isolating matrix as treated by Fan et Spura (cf. the foregoing) and which can be calcukated from the noted equations of Maxwell Garnett. The black appearance has no connection with black dyestuff or dark inorganic salts. The background for this statement is that, according to accepted inorganic chemistry, there exists no black or strongly coloured compounds in the system of aluminium, chlorine, nitrogen, oxygen, hydrogen, which is a system typical for an essential portion of the invention. In spite of this, films formed by submerging aluminium under the more detailedly specified conditions will result in a nearly black, brown or yellow appearance with strong wave-length selective characteristics.

Figure 2:
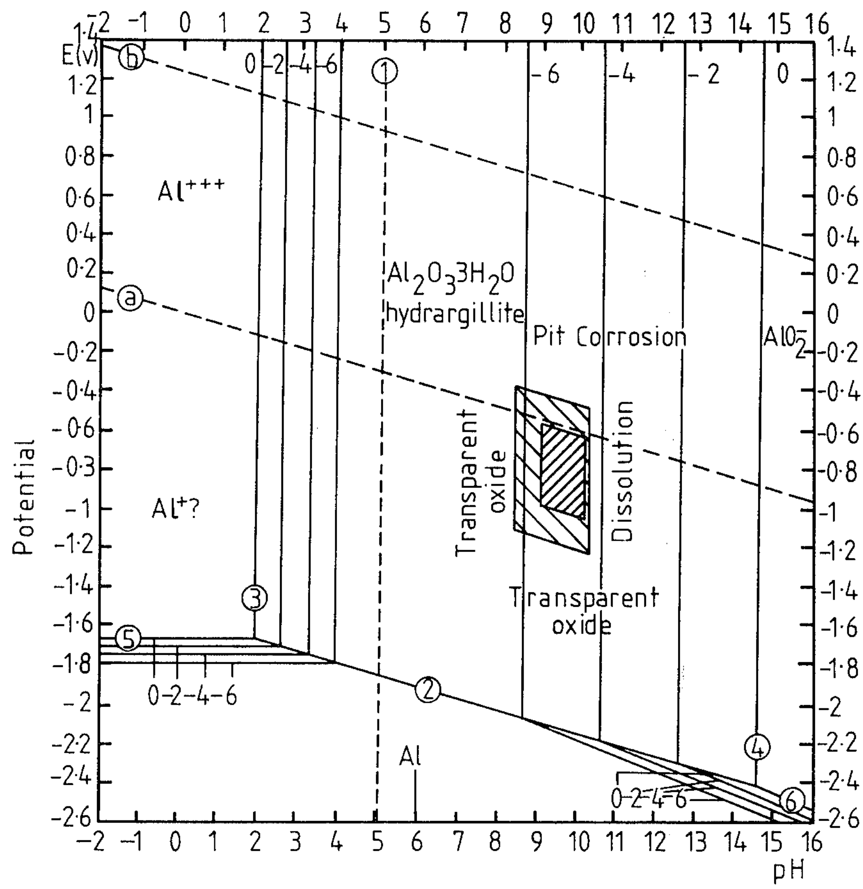
FIG. 2 shows a graphic illustration of the area of potential versus pH for the blackening of aluminium in basic ammonium chloride solutions included in a so-called Pourbaix-diagram.

FIGS. 2 and 3 sum up the results from an extensive research program. FIG. 2 shows the pH-potential diagram for aluminium with the area included which according to experiments gives films suitable for solar panels. This area is at the right side of the diagram restricted by dissolution of the film under formation of aluminate ions. A too high potential will result in pit corrosion. A too low potential or a too low pH will result in normally transparent oxide films. These limits appear to be dependent of the exposure conditions. A higher potential can be used in solutions having a low chlorine content, and the pH-limits can be somewhat shifted by changing the temperature, and the limits can also be somewhat shifted by addition of certain substances to the bath. A series of experiments was effected to find the effect of the various substances in the bath. The experiments seem to indicate that the formation of a wave-length selective film is not dependent on the chemical composition of the solution as long as a small group of substances which have a harmful effect on the film formation is not used. The essential point is that the aluminium is treated within the correct area of potential and pH. It is advantageous to use a salt solution which contains ammonium-, alkali metal- or earth alkali metal-hydroxides.

FIG. 3 shows the ions which can be used and the ions which prevent the formation of films suitable for solar panels. According to the experiments which have been carried out, silicate-, chromate- and phosphate-ions will result in transparent films, even in small amounts. The content of each of silicon, chromium and phosphorous should be maintained under 10 parts per million. Borate-, tetraborate- and carbonate-ions in large amounts (some %) are also disadvantageous. These circumstances presuppose that is must be operated within the correct pH-potential area. If the pH and potential are not under control, it can also be found that for instance addition of soda ($Na_2CO_3$) and borax of soda ($Na_2B_4O_7$) will have a favourable effect thereby that they shift pH and potential into a more favourable area without the specific harmful effects of these ions being brought to expression. As ions which are necessary for the carrying out of the process according to the present invention appear then $OH^-$ and $NH_4^+$, optionally with addition of $AlO_2^-$ or $Ca^{++}$. An aqueous solution containing 1–100 grams per liter of $NH_4Cl$ or $(NH_4)_2SO_4$ may be used. The pH may be adjusted by the addition of $NH_3$, NaOH, KOH or $Ca(OH)_2$.

The electrode potential of aluminium in an aqueous air-saturated solution is normally a number of hundreds mV too low for optimum formation of spectrally selective films even if the bath contains the correct mixture of ions. The corrosion potential can be adjusted by addition of oxidant (advantageously $H_2O_2$) or by electric polarization with very low current density and effect.

The process according to the invention is thereby basically different from normal anodizing. In normal anodizing cell voltages of usually between 15 and 30 volts and current densities of 0.5 to 3 A/dm$^2$ and acid baths are used. The invention described herein uses slightly alkaline baths, cell voltages of a number of hundreds mV and current densities of a number of mA/dm$^2$. Measured in electric effect are only used effects of order of size 1/1000 of those used in ordinary anodizing.

The process is to some extent sensitive to temperature, and the the best temperature for super-pure aluminium will be 25°-55° C., as with temperatures over 55° C. satisfactory films will often not be obtained. Below 20° C. the formation of films is unadvantageously slow. For alloyed aluminium there are no such strongly restricted temperature limits, but no advantage has been shown by passing beyond 100° C.

Different aluminium alloys behave differently. Experiments have so far comprised super-pure aluminium 99.5% Al and NACO 57 S. For these aluminium grades equally valuable films have been obtained, but the conditions must be adapted to the alloy. It is a prerequisite that the more usual types of aluminium can be treated, and it is to be supposed that alloys which are particularly well suited can be found. The fact the super-pure aluminium can be used shows that the formation of the wave-length selective film is not dependent on cathodic phases from the aluminium (from contaminations or alloying elements):

EXAMPLE I

A sheet of commercial pure aluminium (99.5% aluminium) was pickled in a bath consisting of 5% NaOH in water at 40° C. for 3 minutes. Thereupon the sheet was flushed with water and passivated in 1 minute in 2% $HNO_3$ in aqueous solution. After repeated flushing in water the sheet was placed in a bath at 40° C. consisting of:

2% $NH_4Cl$ in water to which $NH_3$ had been added to pH 9.5.

The sheet was provided with an electrical connection made from aluminium and was anodically polarized to a potential of $-0.8$ volts relative to a saturated calomel electrode. The tank for the bath was prepared from polyethylene and was provided with an electrode of 18/8 stainless steel serving as a counter-electrode. A current of about 3.5 mA per dm$^2$ aluminium passed at the beginning of the exposure. This current decreased gradually. Already after 10 minutes the aluminium sheet had been given a black-violet-shimmering appearance. The optical characteristics are shown by the curve A in FIG. 1. For sheets treated in 20 minutes the appearance was blue-black-shimmering, and the optical characteristics were shown by the curve B in FIG. 1. Prolonged exposure beyond 30 minutes resulted in a slow brightening and is normally not recommended. After completed exposure the sheet was taken up, flushed in water and dried.

EXAMPLE II

A series of sheets of 57S aluminium was pickled as in Example I. After flushing in water, this aluminium grade must be passivated in at least 5 minutes in 2% aqueous $HNO_3$ at room temperature. After having been flushed, the sheets were placed in a bath consisting of 2% $NH_4Cl$ in water plus 1.0% $H_2O_2$ to which NaOH had been added to pH 9.5. The bath was at 40° C. The tank for the bath was prepared from polyethylene.

The great majority of types of plastic materials can be used, whereas glass or porcelain has drawbacks because of the possibility that silicate ions may be given off. $H_2O_2$ will gradually be decomposed and consumed. Correct concentration of $H_2O_2$ was controlled by measuring the electrode potential on one of the sheets. The sheet was raised so that one of the clips of a vacuum tube voltmeter could be placed thereon without lettering the clip dip into the water. The other connection of the vacuum tube voltmeter was connected to a saturated calomel electrode situated in the bath. A potential of preferably between $-0.9$ and $-0.67$ volts is to be measured on the aluminium sheet. If the potential is lower, $H_2O_2$ is added. In this particular case the potential was $-0.8$ volt to begin with and decreased to $-0.95$ volt after 10 minutes. One of the sheets was then taken up but found to need further treatment. 0.03% aqueous $H_2O_2$ was added. After further 10 minutes the sheets were taken up, flushed and dried. They were then dark brown.

EXAMPLE III

The following 12 baths were prepared:

1. 3 ml 30% $H_2O_2$/l+NaOH to pH 10.3
2. 3 ml 30% $H_2O_2$/l+KOH to pH 10.3
3. 3 ml 30% $H_2O_2$/l+$Ca(OH)_2$ to pH 10.3
4. 3 ml 30% $H_2O_2$/l+0.1 mole NaOH+HCl to pH 10.3
5. 3 ml 30% $H_2O_2$/l+1 mole NaOH+HCl to pH 10.3
6. 3 ml 30% $H_2O_2$/l+1 mole KOH+HCl to pH 10.3
7. 3 ml 30% $H_2O_2$/l+0.5 mole $Ca(OH)_2$+HCl to pH 10.3
8. 3 ml 30% $H_2O_2$/l+1 mole NaOH+0.01 mole $NaAlO_2$+HCl to pH 10.3
9. 3 ml 30% $H_2O_2$/l+1 mole KOH+0.01 mole $NaAlO_2$+HCl to pH 10.3
10. 3 ml 30% $H_2O_2$/l+1 mole $(NH_4)_2SO_4$+$NH_3$ to pH 10.3
11. 3 ml 30% $H_2O_2$/l+2 moles $NH_4NO_3$+$NH_3$ to pH 10.3
12. 3 ml 30% $H_2O_2$/l+1 mole $(NH_4)_2SO_4$+0.01 mole $NaAlO_2$+$NH_3$ to pH 10.3

Samples of super pure aluminium were first electropolished at about 20 volts in a bath consisting of 5% $HClO_4$ in absolute alcohol at 15° C. and flushed in water. They were then placed in the above described baths which thermostatically were maintained at 40° C. A set of samples was taken up after 15 minutes. All samples gave a satisfactory result. They were all rather alike, having a dark appearance, shimmering in green or violet. The samples from the baths containing $Ca(OH)_2$ and those from the baths to which $NaAlO_2$ had been added, had the darkest appearance.

Another set of samples were removed after 45 minutes. The baths had then been given an addition of 1 ml 30% perhydrol ($H_2O_2$) 20 minutes after the starting up. They were all brown. The samples from the baths without any addition of HCl were clearly brighter than the other ones, which is ascribed to the fact that pH had fallen to 9.7 whereas pH was about 10 for the other baths.

As mentioned under the summing up, tests were also conducted with baths containing silicate-, chromate-, bichromate-, phosphate- and borate ions. These tests did not give satisfactory results.

I claim:

1. A process for providing a dark colored, wavelength selective oxide film on a piece of aluminum which comprises the steps of (1) providing a piece of cleaned aluminum, (2) providing an aqueous treatment bath which contains 1 to 100 g/l of $NH_4Cl$, has a temperature of between 20° and 100° C. and has a pH of 8.9 to 10.9, (3) immersing said piece of cleaned aluminum in said aqueous treatment bath for up to 45 minutes while concurrently subjecting said piece of cleaned aluminum to an electrode potential of between −1.1 and −0.6 volts relative to a saturated calomel electrode, and (4) removing said piece of cleaned aluminum from said aqueous treatment bath.

2. The process as defined in claim 1 wherein during step (3) $H_2O_2$ is added to said aqueous treatment bath to maintain said electrode potential acting on said piece of cleaned aluminum between −1.1 and −0.6 volts relative to a saturated calomel electrode.

3. The process as defined in claim 1 wherein during step (3) said aqueous treatment bath is subjected to electric polarization in order to maintain said electrode potential acting on said piece of cleaned aluminum between −1.1 and −0.6 volts relative to a saturated calomel electrode.

4. The process as defined in claim 1 wherein in step (2) the pH of said aqueous treatment bath is maintained at a pH of 8.9 by the addition of a compound selected from the group consisting of $NH_3$, NaOH, KOH and $Ca(OH)_2$.

5. The process as defined in claim 1 wherein said aqueous treatment bath provided in step (2) has a temperature of between 25° and 550° C.

6. The process as defined in claim 1 wherein said aqueous treatment bath provided in step (2) has a pH of 9.5.

7. The process as defined in claim 1 wherein said piece of aluminum is immersed in said aqueous treatment bath in step (3) for up to 30 minutes.

8. The process as defined in claim 1 wherein said aqueous treatment bath contains $AlO_2^-$ and $Ca^{++}$ ions.

9. The process as defined in claim 1 wherein during step (3) the content of each of Si, Cr and P in the aqueous treatment bath is maintained under 10 ppm.

10. A process for providing a dark colored, wavelength selective oxide film on a piece of aluminum which comprises the steps of (1) providing a piece of cleaned aluminum, (2) providing an aqueous treatment bath which contains 1 to 100 g/l of $(NH_4)_2SO_4$, has a temperature of between 20° and 100° C. and has a pH of 8.9 to 10.9, (3) immersing said piece of cleaned aluminum in said aqueous treatment bath for up to 45 minutes while concurrently subjecting said piece of cleaned aluminum to an electrode potential of between −1.1 and −0.6 volts relative to a saturated calomel electrode, and (4) removing said piece of cleaned aluminum from said aqueous treatment bath.

11. The process as defined in claim 10 wherein during step (3) $H_2O_2$ is added to said aqueous treatment bath to maintain said electrode potential acting on said piece of cleaned aluminum between −1.1 and −0.6 volts relative to a saturated calomel electrode.

12. The process as defined in claim 10 wherein during step (3) said aqueous treatment bath is subjected to electric polarization in order to maintain said electrode potential acting on said piece of cleaned aluminum between −1.1 and −0.6 volts relative to a saturated calomel electrode.

13. The process as defined in claim 10 wherein in step (2) the pH of said aqueous treatment bath is maintained at a pH of 8.9 to 10.9 by the addition of a compound selected from the group consisting of $NH_3$, NaOH, KOH and $Ca(OH)_2$.

14. The process as defined in claim 10 wherein said aqueous treatment bath provided in step (2) has a temperature of between 25° and 55° C.

15. The process as defined in claim 10 wherein said aqueous treatment bath provided in step (2) has a pH of 10.3.

16. The process as defined in claim 10 wherein said piece of aluminum is immersed in said aqueous treatment bath in step (3) for up to 30 minutes.

17. The process as defined in claim 10 wherein said aqueous treatment bath contains $AlO_2^-$ and $Ca^{++}$ ions.

* * * * *